UNITED STATES PATENT OFFICE.

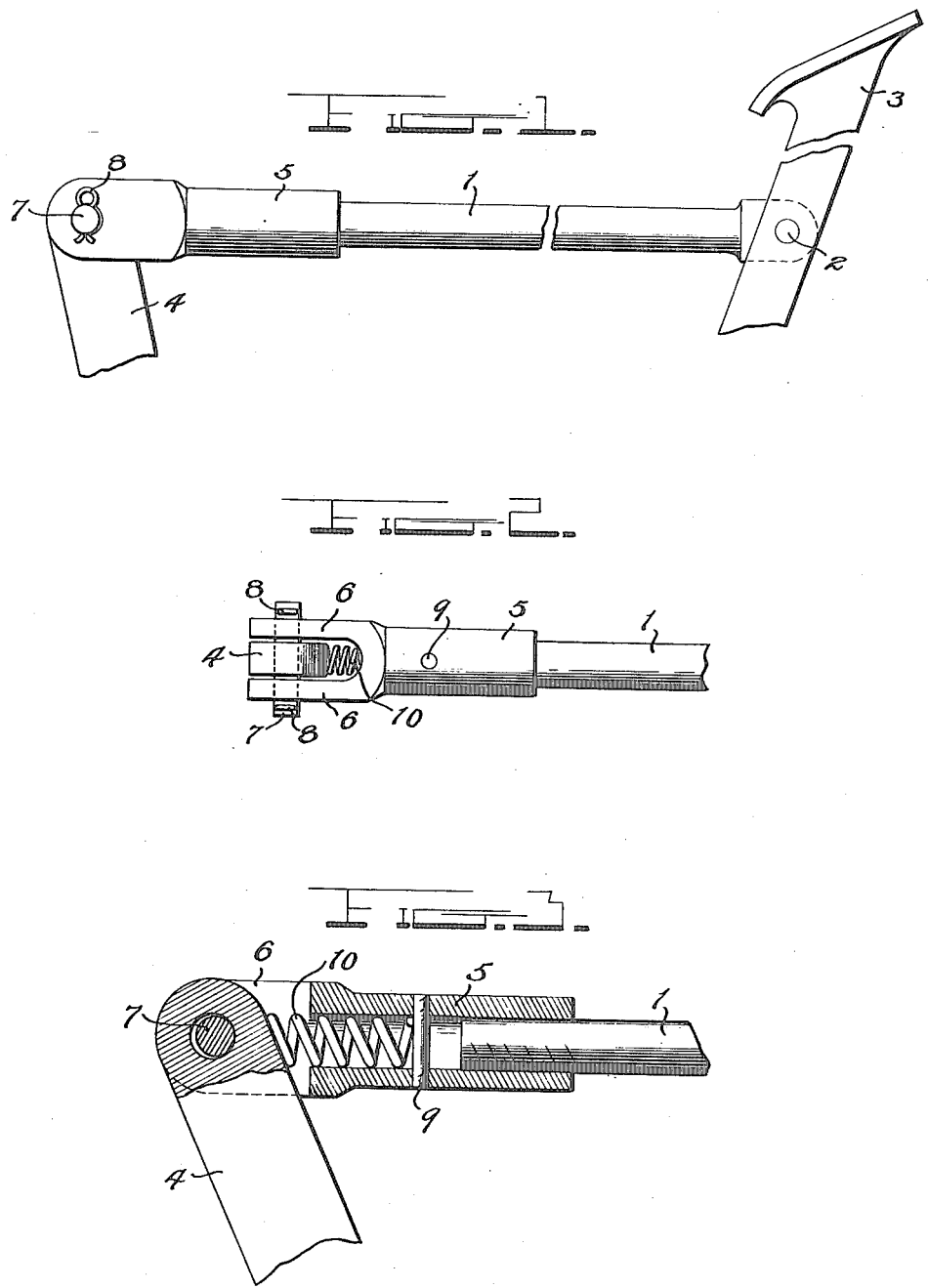

LEWIS COTTINGHAM, OF DELTA, OHIO.

COUPLING FOR BRAKE AND TRANSMISSION RODS.

1,157,618.

Specification of Letters Patent.

Patented Oct. 19, 1915.

Application filed April 11, 1914. Serial No. 831,268.

*To all whom it may concern:*

Be it known that I, LEWIS COTTINGHAM, citizen of the United States, residing at Delta, in the county of Fulton and State of Ohio, have invented certain new and useful Improvements in Couplings for Brake and Transmission Rods, of which the following is a specification.

The present invention relates to a non-rattling coupling for the brake and transmission rods of automobiles and the like, the object of the invention being to provide a device of this character which embodies novel features of construction whereby the parts at the coupling or joint are held in a yielding engagement with each other so as to prevent rattling or objectionable noises even after the parts become worn and loose.

In most automobiles there are a number of knuckle joints or couplings for the brake and transmission rods, and when the parts are new the pivot pins fit snugly within the openings of the joints so that there is no looseness and rattling, although the joints quickly become worn in use, and after they become loose the aggregate rattling noise produced by all of the joints is very objectionable.

The object of the present invention has been to provide a practical and inexpensive means for preventing this rattling noise at the joint after the latter have become worn and loose.

A further object of the invention is to provide a non-rattling coupling joint which can be applied to any conventional form of brake and transmission rod, which is simple and inexpensive in its construction, which will not get out of repair or cause any binding action at the joint, and which will operate in an effective manner to take up the looseness and prevent rattling.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a brake rod provided with a coupling constructed in accordance with the invention. Fig. 2 is a top plan view of the joint between the rear end of the brake rod and the brake lever. Fig. 3 is a longitudinal sectional view through the joint between the brake rod and brake lever.

Corresponding and like parts are referred to in the following description and indicated in all the views of the drawing by the same reference characters.

For the purpose of illustration the invention has been illustrated as applied to the knuckle joint between the rear end of a brake transmission rod and a brake lever, although it will be obvious that the invention may be applied to any similar joint between a transmission rod and the member to which it is pivotally connected.

Referring to the drawings, the numeral 1 designates a brake transmission rod which is of the conventional construction. The forward end of the transmission rod 1 is pivotally connected at 2 to a foot lever 3, while the rear end thereof is connected by a knuckle joint to the brake lever 4. A sleeve 5 is threaded or otherwise fitted upon the rear end of the brake rod 1, the extremity of the sleeve being bifurcated or forked to provide the arms 6 between which the extremity of the brake lever 4 is received, said brake lever being engaged by a pivot pin 7 which passes through the same and connects the arms 6 of the bifurcation. When the parts are new the pivot pin 7 fits snugly within the openings of the arms 6 and brake lever 4 so that there is no looseness at the joint and no rattling. However, the parts quickly become worn at the joint, and in order to prevent rattling the invention provides means for holding the loose parts in a firm but yielding engagement with each other.

The ends of the pivot pin 7 are shown as projecting upon opposite sides of the arms 6 and being transversely perforated to receive the cotterpins 8. Extending transversely across the bore of the sleeve 5 at an intermediate point in the length thereof is a transverse pin 9, and fitted within the bore of the sleeve is a coil spring 10, one end of the said coil spring bearing against the transverse pin 9 while the opposite end thereof bears against the pivot end of the brake lever 4. This spring is always under a certain amount of compression and acts to hold the parts of the joint in a firm but yielding engagement with each other, as indicated by Fig. 3, so as to take up all of the looseness in the joint and prevent rattling. The spring is arranged, however, in such a manner that it does not interfere in any manner with the freedom of movement at the joint and is not liable to be accidentally displaced or injured.

Having thus described the invention, what I claim as new and desire to secure by Letters Patent, is:—

As a new article of manufacture the herein described anti-rattling coupling joint for brakes and the like including a brake rod, a stock formed with a tubular body portion and a bifurcated end arranged in alinement with the bore of the tubular body portion, said tubular body portion being threaded upon the before mentioned rod, a pivot pin connecting the arms of the bifurcated end of the stock, a lever received within the said bifurcation and engaging the pivot pin, a transverse pin passing through the tubular body portion at a point spaced from the end of the rod, and a compression spring received within the tubular body portion of the stock, one end of the spring engaging the transverse pin while the opposite end thereof bears against the end of the lever so as to take up looseness at the joint and prevent rattling.

In testimony whereof I affix my signature in presence of two witnesses.

LEWIS COTTINGHAM.

Witnesses:
M. B. COTTRELL,
D. B. RABER.